May 15, 1951     F. R. W. STRAFFORD     2,553,018
RADIO DISTANCE MEASUREMENT
Filed Oct. 18, 1946
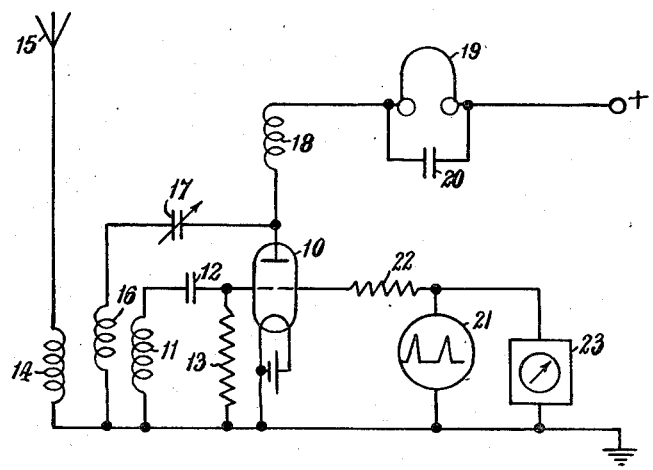
INVENTOR
Frederick R. W. Strafford
By Ralph B. Stewart
Attorney Patented May 15, 1951

2,553,018

UNITED STATES PATENT OFFICE 2,553,018

RADIO DISTANCE MEASUREMENT

Frederick Richmond Wentworth Strafford, London, England, assignor to A. C. Cossor Limited, London, England, a British company Application October 18, 1946, Serial No. 704,140
In Great Britain December 30, 1942

Section 1, Public Law 690, August 8, 1946
Patent expires December 30, 1962

16 Claims. (Cl. 343—13)

This invention relates to measurement of the distance of objects from an origin in space, by the method of transmitting electromagnetic waves from the origin to be reflected by the objects, and of measuring the time interval between the transmission of said waves from the origin and the reception of their reflections at the origin. This method is known as "radar."

The underlying idea of the present invention is the use of a super-regenerative receiver to serve both as transmitter and as receiver, and the adjustment of the quenching frequency so that the reflection of a signal, transmitted at the instant of one build-up of oscillations, is received back at the instant of a subsequent build-up of oscillations.

According to one form of the invention, radar apparatus comprises a super-regenerative radio receiver so arranged as to transmit its own signal every time the quench is removed, and comprises means to vary the quenching frequency and means to indicate the presence and disappearance of noise in the detector output.

According to another form of the invention, radar apparatus for detecting the arrival of a wave-reflecting body at a predetermined range, comprises a super-regenerative receiver so arranged as to transmit its own signal every time the quench is removed, the frequency of the quenching oscillation being such that an electromagnetic wave travels the predetermined range in half a period thereof, and comprises an alarm circuit arranged to operate in response to the disappearance of noise from the detector output.

In modern practice it is customary for a super-regenerative receiver to be provided with a buffer stage of radio frequency amplification, between the aerial and the super-regenerative detection stage, for the purpose of preventing radiation from the aerial. When the invention is employed, on the contrary, efficient radiation is desired. Not only must such buffer stages be omitted, but also, unless the range is very short, a valve capable of providing a substantial amount of power must be used in the super-regenerative detector stage, and other necessary steps must be taken to ensure that a substantial amount of this power is radiated from the aerial.

In a super-regenerative receiver, each time that the quench is removed, an oscillation builds up in the super-regenerative detection stage to a saturation value determined by the valve characteristics. Each time that the quench is reapplied this oscillation is thereby made to cease.

The instants at which the successive build-ups of oscillation occur are slightly advanced when there are present in the input circuit high frequency oscillations whose frequency is sensibly equal to the resonant frequency of the said input circuit. The greater the amplitude of the oscillations present, the earlier the build-up occurs. The output response of the super-regenerative detector is due to this variation of the instants of build-up.

If, at successive instants of removal of quenching, the oscillation amplitudes in the input circuit have a steady value, the detector will give no output response. This is true whatever the value of the oscillation amplitude in the input circuit, provided that it predominates substantially over the noise level in the input circuit. If, however, it does not so predominate, then the random variations of thermal and shot noise E. M. F. in the input circuit will produce random variation of the instants of build-up from the exact periodicity defined by the quenching frequency, and an output response will then be obtained corresponding to the noise. If headphones are employed, an audible hiss will then be heard.

If the period of the quenching oscillation is equal to the echo time of a signal transmitted from the aerial of the super-regenerative receiver and reflected thereto from a body in space, then the echo signals will be received approximately at the instants of removal of quenching. The amplitudes of the echo signals will be very small relative to the amplitudes of the signals transmitted; but their amplitudes at the successive instants of removal of quench will have a steady value. Provided that this value is predominant over the noise level in the input circuit of the super-regenerative detector, the echo signals will have the effect of eliminating the output response of the detector.

In the arrangement according to the invention, means will normally be provided for varying the quenching frequency until the audio noise response disappears, indicating that the period of the quenching oscillation corresponds with the echo time for a reflecting body which is within range of the receiver. The means for varying or for measuring the quenching frequency will be calibrated directly in terms of distance between the receiver and such a reflecting body, this calibration representing the distance travelled by an electromagnetic wave in half the period of the quenching oscillation. It will normally be required that the interval between the instants of build-up of oscillations shall be large compared with the duration of each oscillation. The quenching oscillations, instead of being sinusoidal, will therefore normally consist of a periodic repetition of short pulses. These pulses will be unidirectional, and will be applied in the appropriate sense to remove the quench. The frequency of this quenching oscillation for a given range is precisely determined by the velocity of electromagnetic waves in space. It is contemplated that the invention will find its most important applications at ranges less than a mile, and the quenching oscillation will then have a frequency at least of the order of 100 kilocycles. For very short ranges of a few feet a quenching frequency of the order of 100 megacycles will be required. The frequency of oscillation of the super-regenerative detector, which is the carrier frequency of the radiated signal, should always be at least several times the quenching frequency.

The accompanying drawing is a schematic circuit diagram of a super-regenerative radar equipment embodying the invention.

The triode oscillator valve 10, which should have a substantial power-handling capacity, has a conventional grid circuit comprising coil 11, grid condenser 12 and grid leak 13. The coil 11 is inductively coupled with coil 14, which is connected in circuit with aerial 15. Also inductively coupled with coil 11 is coil 16, which is fed from the anode through variable condenser 17 to provide the necessary regeneration. The frequency of oscillation, which will be mainly determined by the inductances and capacitances in the grid circuit, may be about 30 megacycles.

The output circuit from the anode comprises a radio frequency choke 18, and headphones 19 with the usual by-pass condenser 20.

The quenching oscillation is provided by an oscillator 21, the output of which consists of a periodic repetition of short pulses, and the frequency of which is manually variable. This oscillation is applied to the control grid of valve 10 through resistance 22, the pulses being in positive sense to remove the quench.

Across the quenching oscillation source 21 there is also connected means 23 for measuring the frequency of the generated quenching oscillation. This means is calibrated directly in distance, the scale being such as to represent the distance travelled by an electromagnetic wave in space in half the period of the quenching oscillation.

An ambiguity will result when the period of the quenching oscillation is an exact sub-multiple of the echo time, because a similar elimination of the audio output noise response will be observed. Such ambiguity may be resolved, however, by immediately decreasing the quenching frequency to various sub-multiples of its value, and by observing the lowest frequency at which elimination of noise is observed. This should represent the case where the period of the quenching oscillation is equal to the echo time.

The presence of noise in the audio frequency output may be detected by means other than listening with headphones or a similar device. For example, a meter may be arranged to measure the audio-frequency output of the super-regenerative detector. A device similar to a valve voltmeter may be employed, the audio frequency output signal being applied thereto. In the presence of noise the pointer will oscillate about a certain reading; but if noise is eliminated it will fall and give another, but steady, reading. Another method is to arrange a meter to measure changes in the direct component of the anode current of the super-regenerative detector. Such a meter may be backed off by passing through it a direct current in the reverse direction approximately equal to the standing value of this component, so that it will be particularly sensitive to a change in this component. The disappearance of noise will be indicated by a rise in the direct component of the anode current.

Such means for detecting the disappearance of noise are particularly appropriate for operating an alarm circuit in an apparatus for detecting the arrival of a wave-reflecting body at a predetermined range, a relay controlling the alarm circuit being substituted for the meter. In such an apparatus the quenching frequency is set to correspond with the required range.

I claim:

1. Radar apparatus comprising a super-regenerative radio receiver so arranged as to transmit its own signal every time the quench is removed, and comprising means to vary the quenching frequency and means to indicate the presence and disappearance of noise in the detector output.

2. Apparatus according to claim 1, having means calibrated in terms of distance for indicating the values of the quenching frequency, this calibration representing the distance travelled by an electromagnetic wave in half the period of the quenching oscillation.

3. Apparatus according to claim 1, wherein the means to indicate the presence and disappearance of noise consists in a meter arranged to measure the audio-frequency output of the super-regenerative detector.

4. Apparatus according to claim 1, wherein the means to indicate the presence and disappearance of noise consists in a meter arranged to measure changes in the direct component of the output current of the super-regenerative detector.

5. Radar apparatus for detecting the arrival of a wave-reflecting body at a predetermined range, comprising a super-regenerative receiver so arranged as to transmit its own signal every time the quench is removed, the frequency of the quenching oscillation being such that an electromagnetic wave travels the predetermined range in half a period thereof, and comprising an alarm circuit arranged to operate in response to the disappearance of noise from the detector circuit.

6. Apparatus according to claim 1, wherein the quenching oscillation consists of a periodic repetition of short unidirectional pulses of appropriate sense to remove the quench.

7. Radar apparatus comprising a super-regenerative radio receiver arranged to transmit its own signal every time the quench is removed, including means to vary the quench frequency, means calibrated in terms of distance for indicating the values of quenching frequency, and means to indicate the presence and disappearance of noise in the detector output comprising a meter arranged to measure the audio frequency output of the detector.

8. Radar apparatus comprising a super-regenerative radio receiver arranged to transmit its own signal every time the quench is removed, including means to vary the quench frequency, means calibrated in terms of distance for indicating the values of quenching frequency, and a meter arranged to measure changes in the direct component of the output current of the super-regenerative detector, and to thereby indicate the presence and disappearance of noise in the output of said detector.

9. A superregenerative distance measuring device comprising an oscillatory circuit, an antenna coupled thereto, a pulse generator variable in frequency, for placing the circuit in an oscillatory condition for a short period compared to the frequency of the pulse generator, and means to indicate the reception of a signal during a pulse, the reception of signal during a pulse of a given frequency being the measure of the distance from a reflecting object.

10. A superregenerative distance measuring device comprising an oscillatory circuit, an antenna coupled thereto, a pulse frequency generator for placing the circuit in an oscillatory condition for a short period compared to the frequency of the pulse generator, and means to indicate the reception of a signal during a pulse, the reception of a signal during a pulse of a given frequency being the measure of the distance from a reflecting object.

11. A superregenerative measuring apparatus comprising an oscillator circuit, an antenna coupled thereto, means to render the circuit periodically operable, at which time the circuit and antenna both transmit and receive radio energy simultaneously, means to vary the frequency at which said circuit becomes operable until the energy transmitted during one period is reflected and received during a succeeding period after striking and being reflected by an object, and means to indicate the reception of a signal during a period.

12. A superregenerative measuring apparatus comprising an oscillatory circuit, an antenna coupled therewith, a variable means making said circuit periodically operable, at which time the circuit and antenna will both transmit and receive simultaneously the means being varied in frequency until the energy transmitted during one period is reflected and received during a succeeding pulse, and means to indicate the reception of a signal during a period.

13. Distance measuring radio apparatus comprising a circuit and antenna coupled therewith to simultaneously transmit and receive radio energy, variable means to render said circuit periodically operable, and means to indicate the reception of a signal, the variable means being varied until the energy transmitted at one strikes an object and is reflected and received on a succeeding period, the frequency of the variable means giving a measure of the distance to the reflecting object.

14. In distance measuring apparatus, an antenna system, an electric discharge device having input and output circuits operatively connected with said antenna system, said output and input circuits being linked in positive feedback relationship, means for supplying electric energy to said discharge device, means for periodically varying the gain in said device at an adjustable rate, the maximum gain having a value producing oscillations in the absence of external stimuli and the minimum gain permitting oscillations to die away, indicating means responsive to changes in the amount of electric energy supplied to said discharge device, and means for indicating the repetition rate of said variations in gain.

15. The method of operating a superregenerative circuit and antenna to measure the distance of an object from the antenna comprising, the steps of transmitting oscillation groups at a quench frequency, varying said quench frequency to place the circuit in a receiving condition at the time the reflected energy is intercepted by the antenna, and utilizing the value of said quench frequency to determine the distance of said object from said antenna.

16. The method of operating a superregenerative circuit to measure distances from the circuit to an object comprising the steps of transmitting oscillation groups at a quench frequency, varying the quench frequency to place the circuit in a receiving condition for reflected oscillation groups delayed by periods which are substantially integral multiples of the quench frequency period, and utilizing the value of said quench frequency to determine the distance of said object from said antenna.

FREDERICK RICHMOND
WENTWORTH STRAFFORD.

REFERENCES CITED

The following references are of record in the file of this patent:

UNITED STATES PATENTS

| Number | Name | Date |
|---|---|---|
| 2,417,136 | Smith | Mar. 11, 1947 |
| 2,422,382 | Winchel | June 17, 1947 |
| 2,428,424 | Landon | Oct. 7, 1947 |
| 2,431,344 | Reeves | Nov. 25, 1947 |